United States Patent [19]

Verhoeven et al.

[11] 4,045,812
[45] Aug. 30, 1977

[54] COLOR TELEVISION RECORDING SYSTEM EMPLOYING FREQUENCY MODULATION AND PULSE WIDTH MODULATION

[75] Inventors: Leonardus Adrianus Johannes Verhoeven; Maarten Rutger De Haan; Peter Johannes Michiel Janssen, all of Eindhoven, Netherlands

[73] Assignee: U.S. Philips Corporation, New York, N.Y.

[21] Appl. No.: 642,293

[22] Filed: Dec. 19, 1975

Related U.S. Application Data

[62] Division of Ser. No. 466,626, May 3, 1974, Pat. No. 3,982,272.

[30] Foreign Application Priority Data

Feb. 13, 1974 Netherlands .......................... 7401934

[51] Int. Cl.² .......................... H04N 9/36; H04N 5/79
[52] U.S. Cl. ...................................................... 358/4
[58] Field of Search .................. 358/4, 15, 16, 11-14, 358/6; 360/32, 33, 30; 178/6.6 DD; 325/143

[56] References Cited

U.S. PATENT DOCUMENTS

| | | | |
|---|---|---|---|
| 3,535,433 | 10/1970 | Arimura et al. | 358/4 |
| 3,778,794 | 12/1973 | Szabo | 360/32 |
| 3,852,520 | 12/1974 | Bruch | 358/4 |
| 3,902,010 | 8/1975 | Goshima | 178/6.6 R |

FOREIGN PATENT DOCUMENTS

2,038,874   2/1972   Germany

*Primary Examiner*—John C. Martin
*Attorney, Agent, or Firm*—Frank R. Trifari; Henry I. Steckler

[57] ABSTRACT

A color television system for transmitting a color television signal, specifically for recording on and subsequently reproducing from a record carrier. The color television signal to be transmitted contains a first carrier which is frequency-modulated with the luminance information and a second carrier which is modulated with the chrominance information, whose frequency lies between zero and the first-order lower side band of the modulated first carrier which corresponds to the highest modulation frequency. Said second carrier does not have a fixed frequency, but is locked to the instantaneous frequency of the modulated first carrier by a constant integral ratio. Depending on the characteristics of the transmission medium and the signal processing equipment said ratio is preferably two or three.

1 Claim, 12 Drawing Figures

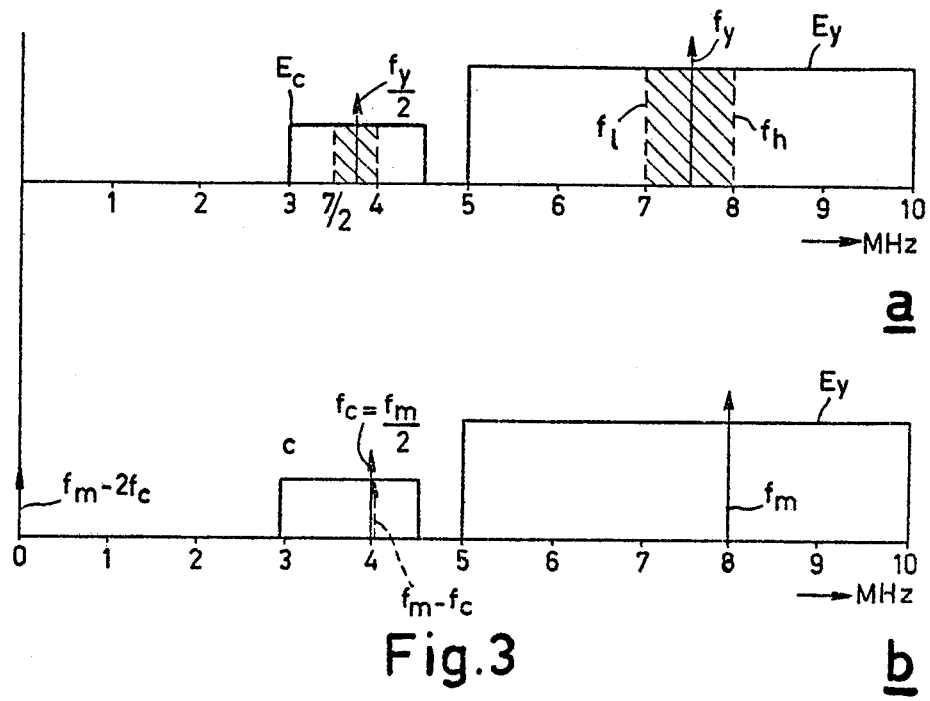
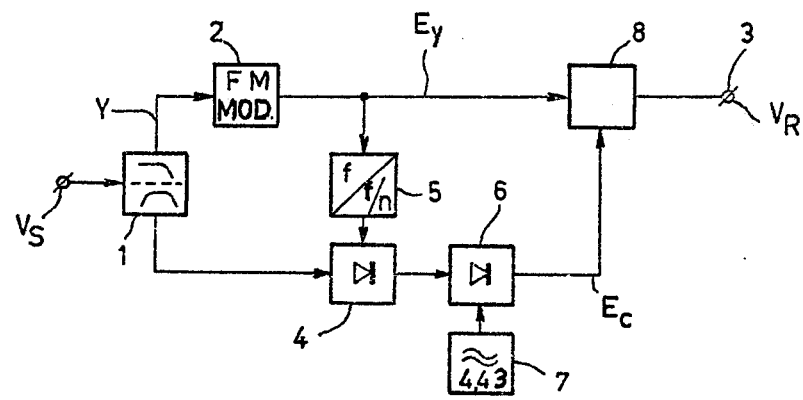
Fig.3
Fig.4

| C' | $L_1$ | $L_2$ | $L_3$ | $L_4$ | $L_5$ |
|---|---|---|---|---|---|
|  | $(R-Y)_1$ | $(B-Y)_2$ | $(R-Y)_3$ | $(B-Y)_4$ | $(R-Y)_5$ |
| 36 |  | $(R-Y)_1-(B-Y)_2$ | $(B-Y)_2-(R-Y)_3$ | $(R-Y)_3-(B-Y)_4$ | $(B-Y)_4-(R-Y)_5$ |
| 37 |  | $(R-Y)_1+(B-Y)_2$ | $(R-Y)_3+(B-Y)_2$ | $(R-Y)_3+(B-Y)_4$ | $(R-Y)_5+(B-Y)_4$ |
| 38 |  | $(R-Y)_1$ | $(R-Y)_3$ | $(R-Y)_3$ | $(R-Y)_5$ |
| 39 |  | $(B-Y)_2$ | $(B-Y)_2$ | $(B-Y)_4$ | $(B-Y)_4$ |

Fig.11

COLOR TELEVISION RECORDING SYSTEM EMPLOYING FREQUENCY MODULATION AND PULSE WIDTH MODULATION

This is a division of application Ser. No. 466,626, filed May 3, 1974, now U.S. Pat. No. 3,982,272.

The invention relates to a colour television system for the transmission of a colour television signal, in particular the recording on and reproduction from a record carrier, which colour television signal to be transferred comprises a first carrier which is frequency-modulated with the luminance information and a second carrier which is modulated with the chrominance information, the frequency of said second carrier lying between zero and the first-order lower side band of the frequency-modulated first carrier associated with the highest modulation frequency.

Such a colour television system, as for example described in U.S. Pat. No. 3,803,347, is of special importance for transmission media which have a limited transmission bandwidth, such as magnetic and optical record carriers in the form of tapes or disks. By means of the colour television system mentioned in the preamble a signal transmission of good quality may be achieved in the case of such transmission media with comparatively narrow bandwidth.

The said colour television system has the additional advantage that phase errors which may be introduced in the colour signal during the transmission, for example as a result of an irregular speed of a record carrier used as a transmission medium, can be substantially eliminated in a very simple manner at the receiver end. In order to eventually obtain a standard colour television signal, the modulated second carrier is transposed to the standard chrominance carrier frequency with the aid of an appropriate mixing signal. By locking the frequency of said mixing signal to a pilot signal which is also transmitted, phase errors introduced in the modulated second carrier during transmission are automatically eliminated during transposition.

A problem associated with said method of transmitting a colour television signal is the occurrence of mixing products between the modulated first and second carriers. If a mixing product of a frequency within the frequency band covered by the modulated first carrier is produced, said mixing product will give rise to interference, so-called morie, in the luminance signal which is eventually reproduced at the receiver end. Similarly, a mixing product of a frequency within the frequency band covered by the modulated second carrier results in interference in the chrominance signal which is reproduced at the receiver end. Which mixing products occur and the disturbing effect of said mixing products depends both on the choice of the carrier frequencies and on the properties of the transmission medium and the signal processing circuits.

In order to minimize the effect of such mixing products the maximum amplitude of the modulated second carrier is selected substantially smaller than the amplitude of the modulated first carrier, so that the amplitude of the resulting mixing products is also small. However, as a result, the signal-to-noise ratio of the transmitted colour signal is relatively small, so that said colour signal is susceptible to interference. Frequently, it is also attempted to minimize the disturbing effect of a certain mixing product by a suitable choise of the frequency of the second carrier, in such a way that the resulting mixing product has a frequency which satisfies the same criterion with respect to the line frequency as the standard chrominance carrier, the so-called quarter-line offset, with or without an additional 25 Hz shift, in the PAL colour system and the so-called half-line offset in the case of NTSC. Interference with a frequency which satisfies such a criterion is known to be least disturbing to the human eye. However, said criterion only allows the influence of one mixing product to be minimized, whilst the disturbing effect of any other mixing product that may occur persists.

It is an object of the invention to provide a colour television system of the type mentioned in the preamble, which permits a relatively high maximum amplitude of the modulated second carrier without giving rise to disturbing mixing products.

Accordingly, the invention is characterized in that the frequency of the second carrier is locked to the instantaneous frequency of the modulated first carrier by a constant integral ratio. Therefore, unlike the known colour television system which employs a second carrier of fixed frequency, a second carrier of varying frequency is used, i.e. a frequency which is locked to the varying frequency of the modulated first carrier. This ensures that the frequency of a certain normally very disturbing mixing product always corresponds to the frequency of the second carrier. Said mixing product therefore only gives rise to a static error in the eventually reproduced colour signal, which is much less disturbing than interference.

The ratio of the second carrier to the frequency of the modulated first carrier preferably equals the value 3 or the value 2. When the first-mentioned ratio, the value 3, is chosen the frequency of the lower second-order mixing product, which equals the frequency of the first carrier minus twice the frequency of the second carrier, exactly corresponds to the frequency of the second carrier, so that its influence is slight. For the said choice of the ratio the lower first-order mixing product, whose frequency equals the frequency of the first carrier minus the frequency of the second carrier, generally lies within the frequency band covered by the modulated first carrier and may therefore still give rise to disturbances in the eventually reproduced luminance signal. Therefore, this choice of the ratio is first of all essential for systems in which during transmission and further processing the signal is processed symmetrically in a satisfactory manner, because in such systems substantially only even-order mixing products are produced around the first carrier.

For the second choice of the ratio, the value 2, the frequency of the lower first-order mixing product corresponds to the frequency of the second carrier. As the subsequent second, third and fourth-order mixing products have frequencies equal to zero, the second carrier frequency, and the first carrier frequency respectively these mixing products are not disturbing either. Therefore, this choice is especially of significance for systems with asymmetrical signal processing. A drawback of said second choice of the ratio compared with the first choice is the fact that the overall bandwidth required for signal transmission is larger when the frequency bands for the modulated first and second carriers remain the same.

The second carrier which is modulated with the chrominance information may be generated in different manners. Which method is used depends inter alia on the composition of the applied colour television signal. According to a first possibility the second carrier is generated with the aid of a first frequency divider stage to which the modulated first carrier is applied. Said first frequency divider stage then divides the frequency by a factor equal to the desired ratio between the modulated first carrier and the second carrier. The second carrier obtained with said first frequency divider stage may then be modulated with any arbitrary chrominance signal.

A first preferred embodiment of the colour television system according to the invention is based on a standard colour television signal with the chrominance information modulated on a standard chrominance carrier and is characterized in that the transmitter includes a first mixing stage, which at a first input receives the modulated chrominance carrier and at a second input the second carrier produced by the first frequency divider stage, whilst furthermore a second mixing stage is provided which at a first input receives the output signal from the first mixing stage and at a second input a first oscillator signal of a frequency equal to that of the standard chrominance carrier and from whose output signal the modulated second carrier is extracted. Said modulated second carrier is subsequently combined with the modulated first carrier, for example by pulse-width modulation of said first carrier, and the combined signal is transmitted. In this respect the term transmitter is to be interpreted in the widest sense and also denotes recording equipment in which the information is recorded on an arbitrary record carrier. Hereinafter, this also applies to the term receiver, which is to be understood to mean also playback equipment for an arbitrary record carrier.

In the first preferred embodiment of the colour television system according to the invention described hereinbefore, the receiver is preferably characterized by the presence of a third mixing stage, to a first input of which the modulated second carrier extracted from the received signal, is applied and to a second input of which a second oscillator signal of a frequency equal to that of the standard chrominance carrier is applied, whilst a fourth mixing stage is provided to whose first input the output signal of the third mixing stage is applied and to a second input of which a sub-frequency signal is applied which with the aid of a second frequency divider stage is derived from the modulated first carrier, extracted from the received signal, the frequency of said sub-frequency signal being equal to that of the second carrier, and from whose output signal a standard chrominance carrier modulated with the chrominance information is extracted. In this respect modulated standard chrominance carrier is to be understood to mean a chrominance signal that can be reproduced by a receiver adapted for the reproduction of a received standard colour signal. Said colour signal need not necessarily conform to all characteristics of said standard colour television signal.

A second preferred embodiment of the colour television system according to the invention is characterized in that the transmitter includes a pulse-width modulator, to which both the modulated first carrier is applied and a low-frequency colour signal, which in line sequential alternation comprises one of the two colour components and which as a result supplies an output signal in which the luminance information is contained as a frequency modulation and the chrominance information as a pulse-width modulation, which output signal is fed to a pulse shaper, which supplies pulses of fixed duration at instants corresponding to the rising and falling edges of the output signal of the pulse-width modulator, which pulse-shaped output signal of the pulse-shaper is used as a transmission signal. Said signal processing in the trasmitter automatically yields a transmission signal which contains the chrominance information as a modulation of a second carrier, whose frequency is half the instantaneous frequency of the modulated first carrier contained in the transmission signal. Said second preferred embodiment is in particular suited to be employed in recording the colour television signal on a disk-shaped record carrier in an optical structure of track-wise arranged blocks alternating with areas, specifically in a manner as described in the U.S. patent application Ser. No. 442,392, filed Feb. 14, 1974, now abandoned. The pulse-shaped output signal of the pulse shaper automatically results in blocks of equal length in the direction of the track on the record carrier, the spatial frequency of said blocks representing the stored information. The use of such blocks, as stated in said U.S. patent application Ser. No. 442,392 yields certain advantages during the read process. In said preferred embodiment of the colour television system according to the invention not only a favourable signal coding is obtained, but also a favourable signal storage on the record carrier, specifically for a disk-shaped optically readable record carrier.

In said second preferred embodiment of the colour television system according to the invention the receiver is preferably characterized by the presence of a filter for extracting a first frequency band around double the first carrier frequency from the received signal, a frequency demodulator for demodulating the luminance information contained in said first frequency band, a band-pass filter for extracting a second frequency band around the first carrier frequency from the received signal, and an amplitude demodulator for demodulating the chrominance information contained in said second frequency band.

In order to derive from the colour signal thus recovered, which has a line sequential composition, a colour signal which is suitable to be reproduced with the aid of a reproducing apparatus operating in accordance with the PAL system, the receiver may include a first and a second amplitude modulator, which both at a first input receive a carrier with a frequency equal to that of the standard chrominance carrier having a mutual phase shift of 90° and of which a second input is connected to a first and a second output respectively of a switch to whose input the chrominance information obtained with the aid of the amplitude demodulator is applied and with the aid of which switch said chrominance information in a line sequentially alternating fashion is fed to the first and second amplitude modulator, the output signals of said first and second amplitude modulator being fed to an adding circuit.

The invention will be described in more detail with reference to the drawing, in which:

FIG. 1 shows a frequency spectrum of the colour television signal as transmitted in the known system, and FIGS. 2 and 3 show frequency spectra of the colour television signal as transmitted by the system according to the invention, FIG. 4 shows a first embodiment of a device for generating such a colour television signal, and FIG. 5 shows a device for deriving a standard colour television from such a transmitted colour television signal, FIG. 6 shows a second embodiment of a device for generating the desired colour television signal, and FIGS. 7a and 7b show the associated signal waveforms and frequency spectra.

Figure 9:
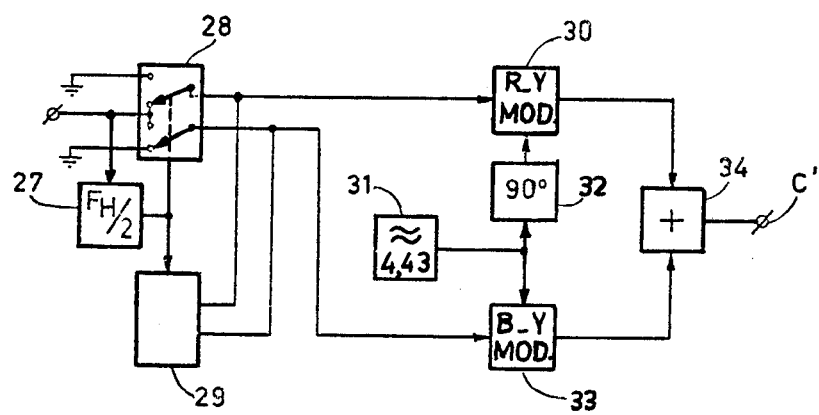
FIG. 9 shows a device for deriving a chrominance signal which is suitable for reproduction by a standard PAL receiver from the extracted chrominance information.

FIG. 11 in the form of a table shows the signal components appearing in said decoding circuit when said circuit receives the output signal of the device of FIG. 9.

Figure 1:
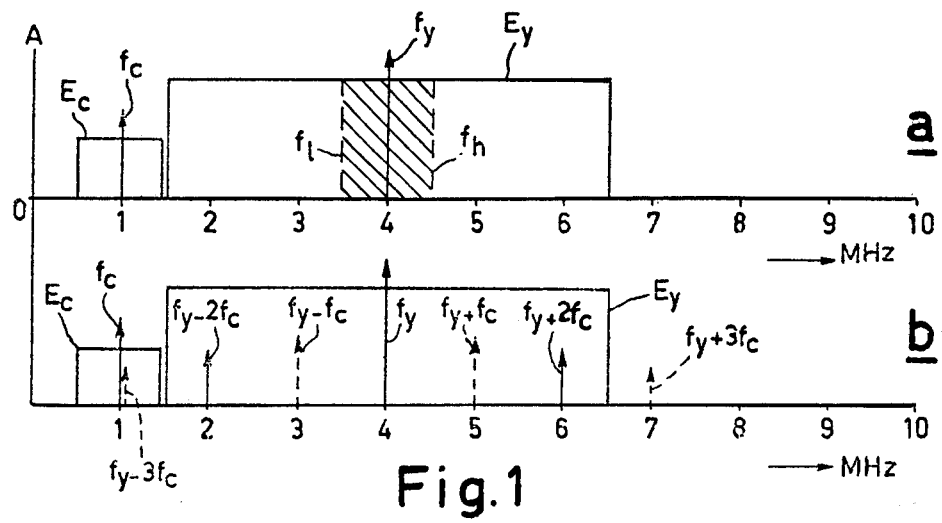

FIG. 1a shows a spectrum of a colour television signal as transmitted in accordance with the method mentioned in the preamble and, in particular, is recorded on a record carrier. here, $E_y$ represents the spectrum of the transmitted luminance signal, which is obtained by frequency-modulating a first carrier $f_y$ with the luminance information contained in the original colour video signal. It is assumed that the frequency sweep, which is shown hatched, is approx 1 MHz, the minimum frequency $f_l$ corresponding to black level and the maximum frequency $f_h$ to white level, whilst $f_y$ corresponds to grey level. To transmit the complete luminance information, the total bandwidth of the $E_y$-signal must be such that in any case the first-order lower side band is also transmitted, so that the overall bandwidth of the $E_y$ signal is selected to be 5 MHz.

$E_c$ represents the spectrum of the transmitted chrominance signal, which is obtained by transposing the chrominance signal contained in the original standard colour television signal to a lower frequency band around the second carrier $f_c$. Care must be taken that the frequency band covered by said $E_c$ signal lies completely outside the frequency band covered by the $E_y$ signal.

Further signal components, such as one or more sound channels, pilot signals etc. may then occupy a frequency band below the frequency band covered by the $E_c$ signal, but as they are irrelevant for the principle of the invention they will completely be left out of consideration hereinafter.

As the two signals $E_y$ and $E_c$ are transmitted in combination, mixing products are obtained during reproduction of the colour television signal. The frequencies of said mixing products naturally depend on the selection of the carrier frequencies. In order to provide an insight into the consequences of said mixing products, the frequency spectrum is shown once again in FIG. 1b, but now with an indication of all the mixing products that are possible. For simplicity, it is assumed that the chrominance signal consists of only one frequency $f_c$, namely 1 MHz, and the luminance signal of one frequency $f_y$, namely 4 MHz, corresponding to a gray level. If this is assumed, mixing products are obtained at the frequencies $f_y \pm f_c$, $f_y \pm 2f_c$, $f_y \pm 3f_c$ etc.; $2f_y \pm f_c$, $2f_y \pm 2f_c$, $3f_y \pm 3f_c$ etc.; $4f_y \pm f_c$ etc. For simplicity only the mixing products around the carrier $f_y$ are indicated, because these exert by far the greatest influence.

When observing the amplitude of said mixing products, it appears that both for the even and oddorder mixing products this amplitude decreases with increasing order, so that the amplitude of the mixing products $f_y \pm f_c$ is greater than the amplitude of the mixing products $f_y \pm 3f_c$ etc., and the amplitude of the mixing products $f_y \pm 2f_c$ is greater than that of the mixing product $f_y \pm 4f_c$ etc. The absolute magnitude of said amplitudes is determined by the ratio of the amplitudes of the two signals $E_y$ and $E_c$ in the transmitted colour television signal. When the relative amplitude of the $E_c$ signal is selected to be small, the amplitude of the mixing products is also small so that their influence on the reproduced picture is small. However, the signal-noise ratio of the colour signal is then also small, so that this signal is sensitive to interference which is the reason why the relative amplitude of the $E_c$ signal is preferably selected not too small.

Since the frequencies above the first carrier frequency are substantially damped as a result of the limited bandwidth of the tranmission medium, it suffices when the influence of the mixing products is considered to examine only the frequency range below the first carrier wave $f_y$. From FIG. 1b it then appears that when the two carrier wave frequencies $f_y$ and $f_c$ are selected within the frequency band required for the reproduction of the luminance signal two mixing products occur with the frequencies $f_y - f_c$ and $f_y - 2f_c$, which give rise to interference in the reproduced luminance signal. The mixing products $f_y \pm f_c$ and the mixing products $f_y \pm 3f_c$ are shown dotted so as to indicate that said mixing products occur only if during at least a certain part of the transmission an asymmetrical signal processing takes place. If the overall transmission is highly symmetric, the influence of said odd-order mixing products around this first carrier is negligible compared with that of the even-order mixing products.

This is for example the case when recording a colour television signal on a magnetic tape, so that with these devices especially the second-order mixing product of the frequency $f_y - 2f_c$ is predominant. Said mixing product results in interference in the reproduced luminance signal with a fixed frequency $2f_c$. In order to minimize the disturbing effect of said mixing product, the second carrier $f_c$ is therefore generally selected so that between said frequency $2f_c$ and the luminance signal a similar frequency interlacing occurs as between the standard chrominance carrier and the luminance signal employed in the standard colour television signal (as described in German Patent Application 2,048,559). For the PAL colour television system this means that $2f_c$ must be selected so as to equal an odd number of times the quarter line frequency, the so-called quarterline offset, if desired increased by an extra 25 Hz.

Thus, for such a system with symmetrical signal processing the disturbing effect of the mixing products on the luminance signal is limited. As can be seen in FIG. 1b there is also a mixing product of the frequency $f_y - 3f_c$, which lies within the frequency band covered by the chrominance signal $E_c$. For the selected frequency values of $f_y$ and $f_c$ said mixing product exactly coincides with the second carrier wave $f_c$. However, if the luminance signal changes, i.e. when the instantaneous frequency of the luminance signal deviates from the reproduced 4 MHz, the frequency of said third-order mixing product also shifts, because it has a constant frequency spacing relative to the instantaneous frequency of the luminance signal. This means that this mixing product may give rise to interference in the reproduced chrominance signal with a frequency which depends on the content of the luminance signal. As a result said interference, despite the fact that the relevant mixing product generally has a small amplitude, may give rise to visible interference.

If during the total signal transmission an asymmetrical signal processing occurs, a more strongly disturbing interference will persist anyway in the reproduced luminance signal despite a possible frequency interlace for one of the mixing products. In this case two mixing products of frequencies $f_y-f_c$ and $f_y-2f_c$ occur within the frequency band of the luminance signal. The influence of said mixing products may be minimized to some extent with the aid of the said frequency interlace, but the remaining mixing product remains disturbing. Said asymmetrical signal processing occurs for example in general when recording a colour television signal on a disk-shaped record carrier, on which the signal is stored in optically coded form, as described in U.S. Pat. application Ser. No. 396,399, filed Sept. 12, 1973, now abandoned, which is a continuation of Ser. No. 229,285, filed Feb. 25, 1972, now abandoned. In practice it appears that especially when using a high-low structure on such a record carrier asymmetrical signal processing occurs with the above-stated consequences. Especially with this type of systems it may therefore be desirable to have a better remedy against the disturbing effect of the mixing products than frequency interlacing.

Figure 2:
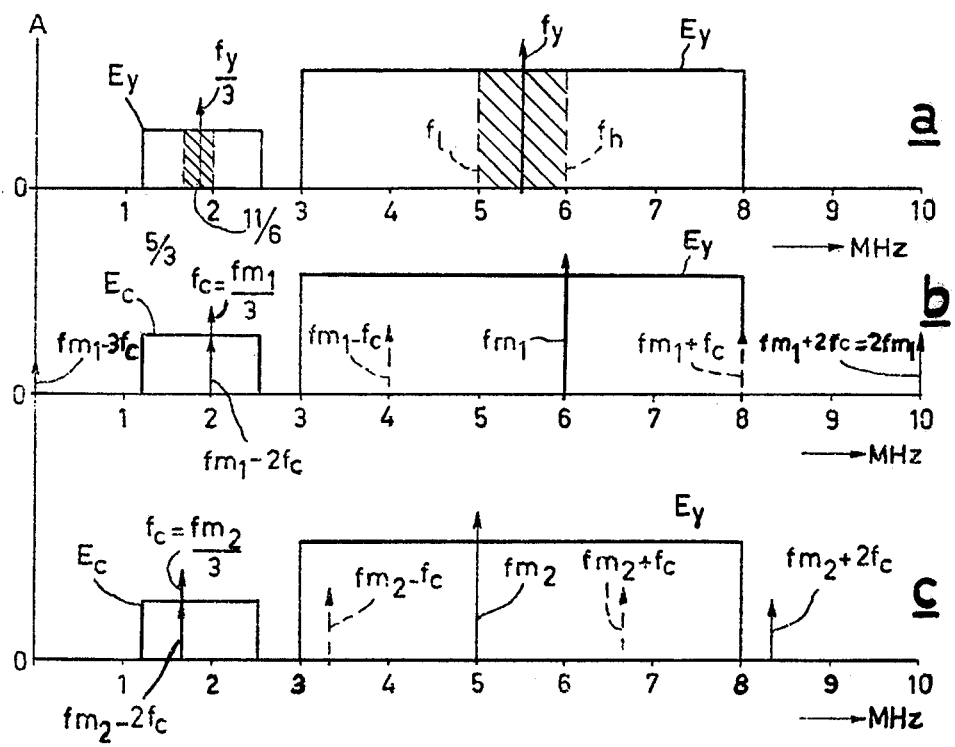

The colour television system according to the invention provides a more effective solution to said problem. FIG. 2a shows a spectrum of a colour television signal as transmitted in the colour television system according to the invention. A frequency sweep between $f_l = 5$ MHz and $f_h = 6$ MHz is now selected for the luminance signal, so that the carrier wave $f_y$ which corresponds to grey lies at 5.5 MHz. The overall bandwidth for the luminance signal $E_y$ to be transmitted is again 5 MHz and consequently ranges from 3 to 8 MHz. However, of this total band again only the lower side band is to be transmitted.

The chrominance signal $E_c$ lies again in a frequency band below that of the luminance signal $E_y$. However, in this case said chrominance signal does not contain a second carrier of constant frequency but a carrier which by a constant ratio, specifically a factor 3, is locked to the instantaneous frequency of the luminance signal. In the present embodiment, in which the frequency of the luminance signal varies between 5 and 6 MHz, the frequency of the second carrier varies between 5/3 and 6/3 = 2 MHz, as is shown by the hatched part. For the first carrier $f_y = 5.5$ MHz which corresponds to grey, the second carrier becomes $f_y/3 = 11/6$ MHz, which is shown in the Figure.

To illustrate this locking between said second carrier for the chrominance signal and the instantaneous frequency of the luminance signal and the consequences of said locking, the frequency spectra of the two extreme conditions are shown in FIGS. 2b and c. In FIG. 2b it is assumed that the recorded luminance signal is peak white, so that for the adopted choice of the frequency sweep of the luminance signal said signal has an instantaneous frequency of $f_{m1} = 6$ MHz. The frequency of the second carrier is then instantaneously $f_c 32 (fm1)/3 = 2$ MHz. The most significant mixing products are again shown in the frequency spectrum. From this it appears that the lower first-order mixing product $f_{m1}-f_c$ lies within the frequency band of the luminance signal $E_y$. The lower second-order mixing product, however, has a frequency of $f_{m1}-2f_c = f_{m1}-2f_{m1}/3 = f_{m1}/3 = f_c$, i.e. exactly the second carrier frequency. This means that said mixing product only gives rise to a static error in the reproduced chrominance signal, which is much less disturbing than interference.

In FIG. 2c it is assumed that the recorded luminance signal is peak black, so that the luminance signal has an instantaneous frequency of $f_{m2} = 5$ MHz. This results in a second carrier wave having a frequency of $f_c = f_{m2}/3 = 5/3$ MHz. Of the significant mixing products the lower first-order mixing product $f_{m1} - f_c$ lies again in the frequency band of the luminance signal $E_y$, whilst the lower second-order mixing product $f_{m2}-2f_c = f_{m2} - 2f_{m2}/3 = f_c$ again exactly coincides with the second carrier wave $f_c$.

In the colour television system according to the invention the frequency of the lower second-order mixing product always exactly corresponds to the frequency of the second carrier $f_c$ for the chrominance signal when a ratio of three is chosen, so that said mixing product only has a slightly disturbing effect on the reproduced chrominance signal. The only mixing product which may give rise to a disturbance is the lower first-order mixing product, which may cause interference in the reproduced luminance signal. The embodiment shown in FIG. 2 in which a ratio of three is employed is first of all intended for systems with a reasonably symmetrical signal processing, because then the influence of said first-order mixing product is negligible.

FIG. 3a shows the frequency spectrum of a transmitted colour television signal, for which a ratio of two has been selected. In order to enable the luminance signal $E_y$ and the chrominance signal to be accommodated in two non-overlapping frequency bands, the frequency sweep of the luminance signal must be contained in a higher frequency band than in the embodiment of FIG. 2. In the shown embodiment said frequency sweep ranges between $f_l = 7$ MHz and $f_h = 8$ MHz. The overall frequency band required for the luminance signal then extends from 5 to 10 MHz.

For this choice of the frequency sweep of the luminance signal the second carrier wave used for the chrominance signal varies between the frequency values $f_l/2 = 3.5$ MHz and $f_h/2 = 4$ MHz, as indicated by the hatched part. FIG. 3b represents the situation in the case that the recorded luminance signal is peak white, i.e. the transmitted luminance signal has a frequency of $f_m = 8$ MHz. The second carrier wave for the chrominance signal is then $f_c = f_m/2 = 4$ MHz. When the location of the mixing products is now considered again, it appears first of all that the lower first-order mixing product has a frequency of $f_m-f_c = f_m-f_m/2 = f_m/2 = f_c$, i.e. exactly the second carrier frequency, irrespective of the content of the luminance signal. The disturbing effect of said mixing product in the reproduced picture is consequently minimal, as already explained with reference to FIG. 2. The lower second-order mixing product has a frequency of $f_m - 2f_c = 0$ MHz and consequently has no effect at all. This means that both within the frequency bands occupied by the luminance signal $E_y$ and the chrominance signal $E_c$, no mixing products occur which might give rise to interference. Therefore, the amplitude of the chrominance signal may be selected relatively high without causing annoying disturbances in the reproduced colour television signal.

Of course, still other ratios are possible between the instantaneous frequency of the luminance signal and the second carrier wave for the chrominance signal. For example, if four is selected for said ratio, the lower third-order mixing product will coincide with said second carrier. However, both the lower first-order and the second-order mixing product are then contained within the frequency band of the luminance signal, so that this choice of the ratio is already less meaningful than the two first-mentioned possibilities.

FIG. 4 shows a first possibility of obtaining the desired frequency spectrum for the colour television signal to be transmitted at the transmitter end. This method is based on a standard colour television signal, for example a PAL-standard colour television signal with a quadrature-modulated standard chrominance carrier which lies within the frequency band of the luminance signal. Said standard colour television signal $V_s$ is applied to a separating filter 1, in which the chrominance signal is extracted by means of a band-pass filter and the luminance signal $y$ by means of a low-pass filter. Said extracted luminance $y$ is applied to a frequency modulator 2, at whose output the first carrier frequency-modulated by the luminance information is available. Said signal $E_y$ is fed to a frequency divider stage 5, which divides the frequency of the applied signal by a factor $n$, which equals the desired ratio. Said sub-frequency signal, which has a frequency which relative to the instantaneous frequency of the modulated first carrier wave is reduced by a ratio $n$ is fed to a mixing stage 4, to which the extracted chrominance signal on the standard chrominance carrier, in the present example the 4.43 MHz PAL signal, is also applied. The output of said mixing stage 4 is connected to an input of a mixing stage 6, which also receives a signal of a frequency equal to that of the standard chrominance carrier of 4.43 MHz, which signal is produced by a stable crystal oscillator. From the output signal of said mixing stage 6 the desired chrominance signal $E_c$ can then be extracted, which then consists of a quadrature-modulated second carrier, which second carrier has a frequency corresponds to the output signal frequency of the frequency divider stage 5 and thus has a frequency which with a constant integral ratio $n$ is locked to the frequency of the luminance signal $E_y$.

The luminance signal $E_y$ and the chrominance signal $E_c$ are combined with the aid of a combination circuit 8, at an output terminal 3 of which the colour television signal $V_R$ to be transmitted is available. Combination of these two signals is possible in various manners. In the case of recording on a magnetic record carrier the two signals $E_y$ and $E_c$ may simply be added and the sum signal may be recorded. In the case of the previously mentioned disk-shaped optical record carrier the chrominance signal $E_c$ may be added to the luminance signal $E_y$ by pulse-width modulation, which is described in U.S. Pat. No. 3,893,163, because with said record carrier only two signal levels are possible so that an amplitude modulation cannot be recorded directly.

Figure 5:
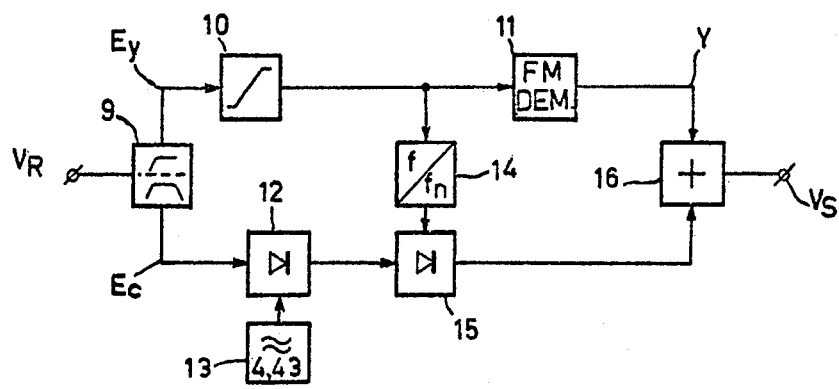

FIG. 5 shows an embodiment of the receiver for re-converting a colour television signal $V_R$ thus transmitted into a standard colour television signal $V_s$. The receiver first of all includes a separating filter 9 for extracting the luminance signal $E_y$ and the chrominance signal $E_c$ from the received signal $V_R$. The luminance signal $E_y$ is fed to a limiting circuit 10 and subsequently to a frequency demodulator 11, at whose output the demodulated luminance signal $y$ to be reproduced is available. The chrominance signal $E_c$ is fed to a mixing stage 12, which also receives an oscillator signal from a crystal oscillator 13 with a frequency equal to that of the standard chrominance carrier. The output of said mixing stage is connected to a first input of a mixing stage 15, a second input of which is connected to a frequency divider stage 14 to which the limited luminance signal $E_y$ is applied. Said frequency divider stage 14 divides the frequency of the luminance signal by a factor $n$ which is equal to the applied ratio. As a result, a chrominance signal modulated on the standard chrominance carrier is available at the output of the mixing stage 15. Said chrominance signal is added to the demodulated luminance signal $y$ so that the standard colour television signal $V_s$ is obtained.

Said receiver circuit not only enables a correct re-conversion of the transmitted colour television signal into the standard colour television signal, but it also enables phase errors introduced in the chrominance signal during transmission to be compensated for. If, phase errors occur, for example, owing to an irregular speed of a record carrier on which the colour television signal is recorded, said errors will occur both in the luminance signal and in the chrominance signal. Since the mixing stage 15 now receives two signals having the same phase error, said phase error is eliminated during mixing, so that it no longer appears in the standard chrominance signal, in which phase errors would be very disturbing.

Figure 6:
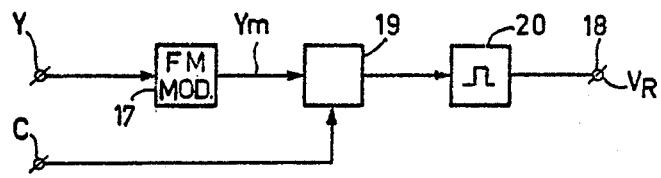
Figures 7A, 7B:
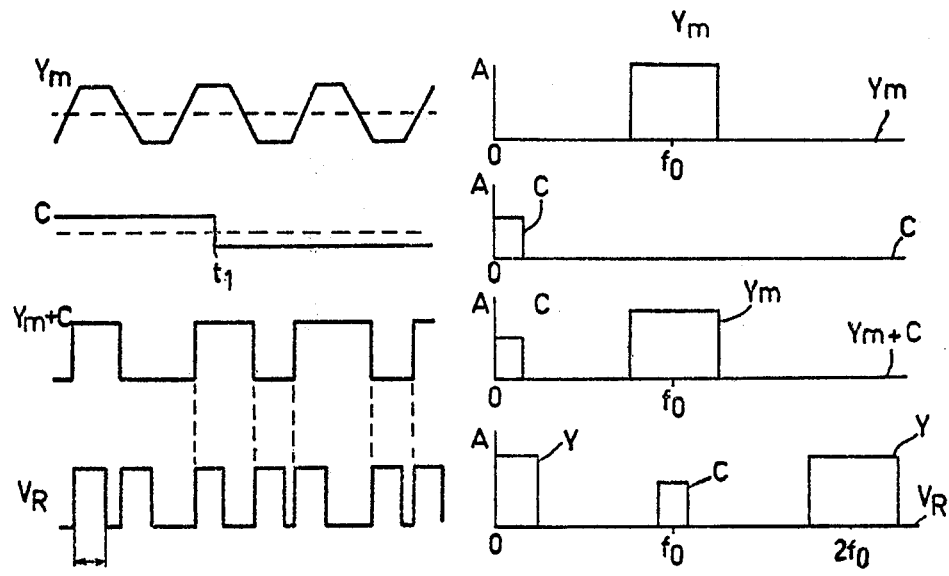

FIG. 6 shows a second embodiment of the transmitter for obtaining the desired colour television signal for transmission. Again, a luminance signal Y is modulated on a carrier of a frequency $f_o$ with the aid of a frequency modulator 17. However, as chrominance signal not a standard chrominance signal is applied but a low-frequency line-sequential chrominance signal C. Consequently, said chrominance signal line sequentially always contains one of the two possible colour components that are usual in colour television systems, i.e. every alternate line the (R-Y) and the (B-Y) component. Said chrominance signal C is added to the luminance signal $Y_m$ in a circuit 19 as a pulse-width modulation. To clarify the consequences of the various operations, reference is made to FIGS. 7a and b. FIG. 7a each time shows the waveforms of the various signals and FIG. 7b the frequency spectrum. It is assumed that the luminance signal $Y_m$ is a trapezium-shaped signal, which is particularly suitable for pulse-width modulation. Of course, a triangular signal is equally suitable, whilst even a sinewave signal may be usable, in which case the pulse-width modulation should not be too deep. Said luminance signal covers a frequency band around $f_o$, as can be seen in FIG. 7b.

It is obvious that the low-frequency chrominance signal C covers a frequency band near zero frequency. For simplicity it has been assumed in FIG. 7a that the chrominance signal C has a first constant value until the instant $t_1$ and after said instant $t_1$ a second constant value.

The pulse-width modulation yields a signal $Y_m+C$, whose frequency spectrum is the sum of the spectra of the signals $Y_m$ and C and which has a response as shown in FIG. 7a, which Figure clearly shows the varying pulse width. Pulse-width modulation may be effected in any known manner. It is for example possible to employ a comparator circuit, which compares the values of the two signals and which supplies a pulse-shape signal whose edges appear at instants at which equality of the two signals is detected. Another possibility is to add the two signals and subject the sum signal to a limitation, as described in the previously cited U.S. patent application Ser. No. 344,863.

The signal which is taken from the pulse-width modulator 19 is finally applied to a pulse shaper 20, which at an output terminal 18 supplies a pulse-shaped signal $V_R$ whose pulse duration $T_o$ is constant and whose leeding edges correspond to the edges of the signal $Y_m + C$. This signal which is supplied by the pulse shaper 20 has a frequency spectrum as is shown in FIG. 7b. The frequency band around the frequency $f_o$ originally occupied by the luminance signal Y is now transposed to two frequency bands as a result of the action of the pulse shaper 20, namely a frequency band around a frequency $2f_o$ and a frequency band near zero frequency. The frequency band near the zero frequency which is originally occupied by the chrominance signal E is transposed to a frequency band around the frequency $f_o$ as a result of the signal processing of the pulse shaper 20.

This means that the luminance information is present as a frequency modulation of a carrier wave $2f_o$, whilst the chrominance information is modulated on a carrier wave of a frequency which is half the instantaneous frequency of said luminance signal. Thus, as a result of the use of the pulse shaper 20, a colour television signal $V_R$ is obtained which automatically exhibits the desired locking between the chrominance carrier and the instantaneous frequency of the luminance signal.

The pulse-shaped colour television signal $V_R$ thus obtained is particularly suited to be recorded on a disk-shaped record carrier in optically coded form in a manner described in the U.S. patent application Ser. No. 442,392 filed Feb. 14, 1974, now abandoned. Here, use is made of trackwise arranged blocks alternating with areas, the length of the blocks in the track direction being constant in a special embodiment so that the information is exclusively represented by the spatial frequency of said blocks. This is especially advantageous if the record carrier has a high-low structure, i.e. when the blocks are pressed into a flat disk as pits. Determining the positions of the centres of said pits in the track direction with the aid of an optical read apparatus, which suffices for pits of equal length, then provides greater accuracy than determining the positions of the descending and the ascending walls of said pits, which is necessary for pits of different lengths.

As the colour television signal $V_R$, which is applied by the pulse shaper 20, already comprises pulses of equal length, said signal may be readily recorded in said advantageous manner, the recorded pits corresponding to the pulses.

Figure 8:
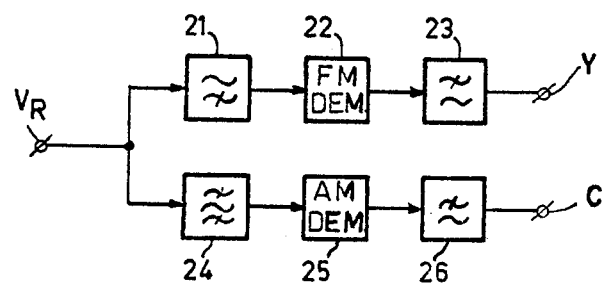
FIG. 8 shows a device for extracting the chrominance and luminance information from the colour television signal thus transmitted.

Recovering the original luminance and chrominance signals from a colour television signal which is recorded in such a manner may be effected very simply, as is shown in FIG. 8. The incoming signal $V_R$ is applied to a high-pass filter 21, which extracts the frequency band around a frequency $2f_o$. Said frequency band contains the luminance signal as a frequency modulation, which luminance signal is recovered with the aid of a frequency demodulator 22 and a low-pass filter 23, which serves to eliminate undesired signal components. The received signal $V_R$ is also applied to a band-pass filter 24, which extracts the frequency band around the frequency $f_0$. The chrominance signal C contained in said frequency band is recovered with the aid of an amplitude demodulator 25 and a low-pass filter 26, which again removes undesired signal components.

The chrominance signal C thus recovered is a low-frequency line-sequential chrominance signal. It can be adapted for reproduction via a normal receiving apparatus in various manners. FIG. 9 shows an example, the chrominance signal C being processed in such a way that the chrominance signal eventually obtained can be reproduced by a PAL receiver.

The apparatus shown in FIG. 9 includes two modulator circuits 30 and 33, the modulator 30 being destined for the (R-Y) colour component and the modulator 33 for the (B-Y) colour component. An oscillator signal produced by a crystal oscillator 31 with a frequency equal to the standard chrominance carrier frequency of 4.43 MHz is applied to each of the two modulator circuits as a carrier wave, the carrier signal for the modulator 30 having been subjected to the necessary 90° phase shift with the aid of a phase shifting circuit 32.

The modulation signals for these two modulator circuits 30 and 33 are taken from a switch 28. Said switch applies the low-frequency line-sequential chrominance signal C applied to its input alternately to the modulators 30 and 33, i.e. line sequentially. This is effected with the aid of a switching signal of half the line frequency $F_H/2$, which is supplied by a control device 27. Said control device also receives an identification signal, which is for example contained in the chrominance signal C and which ensures that the switching cycle of the switch 28 is always such that the (R-Y) component which is line-sequentially present in the applied chrominance signal is always fed to the modulator 30 and the (B-Y) component is always applied to the modulator 33.

With the aid of a pulse generator 29 colour burst pulses are alternately added to the two colour signals (R-Y) and (B-Y) so as to obtain the required alternating colour-burst signals required for a PAL receiver in combination with the burst pulses already contained in the received colour signal.

Figure 10:
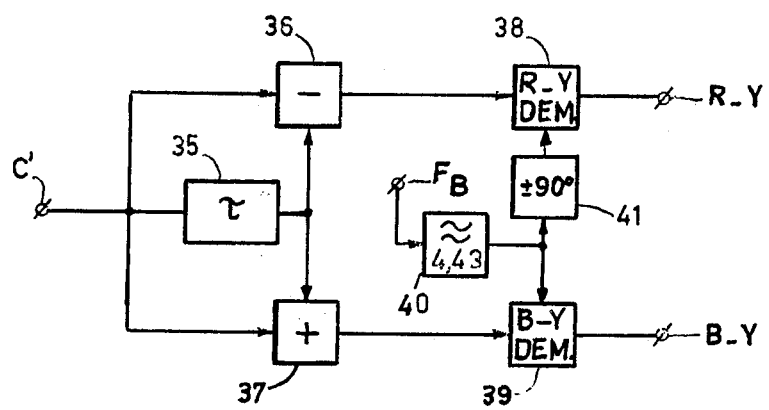
FIG. 10 shows a PAL decoding circuit.

The output signals of the two modulator circuits 30 and 33 are applied to an adder circuit 34, so that again a continuous chrominance signal C' is obtained at its output, which line sequentially contains the two colour components (R-Y) and (B-Y) as a modulation on the standard chrominance carrier. Said chrominance signal C' can be reproduced via a PAL receiver as will be described with reference to FIG. 10, which shows a PAL decoding circuit.

Said decoding circuit, in known manner, includes delay line 35, which introduces a delay equal to one line time. The chrominance signal C' is applied to said delay line. The chrominance signal C' is fed to a subtractor circuit 36 and an adder circuit 37, the output signal of the delay line 35 being also applied to the two circuits 36 and 37. The output signal of the subtractor circuit 36 is fed to an (R-Y) demodulator 38 and the output signal of the adder circuit 37 to a (B-Y) demodulator 39. Said two demodulator circuits 38 and 39 receive an oscillator signal which with the aid of a controllable oscillator 40 is derived from the colour burst $F_B$ which is extracted from the colour television signal. The oscillator signal for the (R-Y) demodulator is then line-sequentially phase-shifted by +90° and −90° with the aid of a phase-shifter circuit 41. Finally, the two demodulator circuits 38 and 39 continuously supply the two chrominance signals (R-Y) and (B-Y).

In order to clarify this reference is made to the table of FIG. 11. The vertical columns indicate which colour component is present in the signal C' during a specific line, the output signals of the adder and subtractor circuits 36 and 37 and the output signals of the demodulator circuits 38 and 39. It is assumed that the odd lines $L_1$, $L_3$, $L_5$ etc. of the chrominance signal C' contain the (R-Y) component and the even lines $L_2$, $L_4$ etc. the (B-Y) component. The indexes of said colour components in the table indicates to which line the relevant colour component corresponds.

The adder circuit 37 each time combines the directly incoming colour components and the colour component which has been delayed by one line time, i.e. the colour component transmitted during the preceding line. The same applies to the subtractor circuit 36, except for the sign, so that the output signals of these two circuits always contain both colour components in accordance with the columns 36 and 37 in the table.

The demodulator 38 only demodulates the (R-Y) colour component of the applied signal and the demodulator 39 the (B-Y) colour component, so that at the outputs of said demodulator circuits 38 and 39 the colour signals indicated in the table are obtained. Thus, the two colour components (R-Y) and (B-Y) are continuously available, the same (R-Y) colour component being used for two consecutive lines and also the same (B-Y) colour component for two consecutive lines, but which are shifted by one line time relative to the first-mentioned component. This means, as is inherent in a line-sequential colour system, that the colour resolution in a vertical sense is halved relative to a normal PAL signal, which in most cases is still acceptable.

It will be evident that the scope of the invention is not at all limited to the embodiments shown in the Figures. Those skilled in the art will readily be able to indicate various methods to achieve a certain desired signal processing.

What is claimed is:

1. A record carrier on which a color television signal having luminance and chrominance information is recorded with a low frequency chrominance signal having alternately from line to line two different single color components and a first carrier frequency modulated by the luminance information, said frequency modulated carrier being pulse-width modulated by the chrominance signal, said carrier comprising a pattern of blocks alternating with areas disposed along a track direction on said carrier, the blocks having a constant length in the track direction and representing the rising and falling edges of the frequency and pulse-width modulated first carrier.

* * * * *